US011460329B2

United States Patent
Marx et al.

(10) Patent No.: US 11,460,329 B2
(45) Date of Patent: Oct. 4, 2022

(54) SENSOR SYSTEM

(71) Applicant: LUNA INNOVATIONS GERMANY GMBH, Cologne (DE)

(72) Inventors: Benjamin Marx, Cologne (DE); Alexander Rath, Cologne (DE); Wieland Hill, Cologne (DE); Stefan Breuer, Cologne (DE)

(73) Assignee: LUNA INNOVATIONS GERMANY GMBH, Cologne (DE)

( * ) Notice: Subject to any disclaimer, the term of this patent is extended or adjusted under 35 U.S.C. 154(b) by 0 days.

(21) Appl. No.: 17/041,671

(22) PCT Filed: Mar. 26, 2019

(86) PCT No.: PCT/EP2019/057560
§ 371 (c)(1),
(2) Date: Sep. 25, 2020

(87) PCT Pub. No.: WO2019/185616
PCT Pub. Date: Oct. 3, 2019

(65) Prior Publication Data
US 2021/0010833 A1 Jan. 14, 2021

(30) Foreign Application Priority Data
Mar. 26, 2018 (DE) ............. 10 2018 107 162.0

(51) Int. Cl.
*G01D 5/353* (2006.01)
*G01K 11/3206* (2021.01)

(52) U.S. Cl.
CPC ..... *G01D 5/35316* (2013.01); *G01K 11/3206* (2013.01)

(58) Field of Classification Search
CPC ............. G01D 5/35316; G01D 5/3539; G01K 11/3206
See application file for complete search history.

(56) References Cited

U.S. PATENT DOCUMENTS

2002/0025097 A1  2/2002  Cooper
2015/0285683 A1* 10/2015  Ouellette ........... G01D 5/35354
                                                    356/451

FOREIGN PATENT DOCUMENTS

EP    3291192 A1   3/2018
GB    2485808 A    5/2012

OTHER PUBLICATIONS

Search Report dated Feb. 8, 2019 by the German Patent and Trademark Office in corresponding Application No. 87122DF1.

(Continued)

*Primary Examiner* — John Bedtelyon
(74) *Attorney, Agent, or Firm* — Buchanan Ingersoll & Rooney P.C.

(57) ABSTRACT

A sensor system for detection and localisation of changes in or values for at least one environmental condition includes a source of pulses of electromagnetic radiation, wherein the source is configured to emit electromagnetic radiation at a plurality of different wavelengths, an optical fibre in optical communication with the source of pulses, wherein the optical fibre includes a fibre Bragg grating having a reflectance and/or transmittance which varies in dependence on the at least one environmental condition, and a detection unit for detecting electromagnetic radiation which has been reflected or transmitted by the fibre Bragg gratings, wherein the detection unit is configured for detecting electromagnetic radiation at the plurality of wavelengths, such that a spectral response can be determined for different spatial regions along the optical fibre, wherein a change in or value for the environmental condition at a spatial region may be determined by monitoring the respective spectral response.

18 Claims, 3 Drawing Sheets

(56) References Cited

OTHER PUBLICATIONS

Wang, Y. et al. "A Quasi-Distributed Sensing Network With Time-Division-Multiplexed Fiber Bragg Gratings" IEEE Photonics Technology Letters, vol. 23, No. 2, Jan. 15, 2011, Pages.

Zhang, M. et al. "A large capacity sensing network with identical weak fiber Bragg gratings multiplexing" Optics Communicabons, vol. 285, (2012), pp. 3082-3087.

Ryu, C. et al. "Development of fiber Bragg grating sensor system using wavelength-swept fiber laser" Smart Mater. Struct. vol. 11, 2002, pp. 468-473.

Njegovec, M. et al. "Interrogation of FBGs and FBGs Arrays Using Standard Telecom DFB Diode" Lightwave Technol. vol. 34, (2016), No. 22, pp. 5340-5348.

Schreiner, N. S. et al. "High-resolution FMCW millimeter-wave and terahertz thickness measurements" Proceedings of the 47th European Microwave Conference, 2017, pp. 1187-1190.

Tosi, D. "Review and Analysis of Peak Tracking Techniques for Fiber Bragg Grating Sensors" Sensors, Bd. vol. 17, 2017, No. 10, 35 pages.

Wu, H. et al. "Support vector machine assisted BOTDA utilizing combined Brillouin gain and phase information for enhanced sensing accuracy" Optics Express, Bd. 25, 2017, No. 25, p. 31210-31220.

Kreger, S. T. et al. "High Resolution Distributed Strain or Temperature Measurements in Single- and Multi-mode Fiber Using Swept-Wavelength Interferometry" in Optical Fiber Sensors, 2006.

Kersey, A.D. et al. "Fiber grating sensors," Journal of Lightwave Technology vol. 15, No. 8, pp. 1442-1463, Aug. 1997.

Wang, Y. et al. "A Large Serial Time-Division Multiplexed Fiber Bragg Grating Sensor Network" Journal of Lightwave Technology, 6 pages.

Werzinger, S. et al. "Quasi-Distributed Fiber Bragg Grating Sensing Using Stepped Incoherent Optical Frequency Domain Reflectometry" Journal of Lightwave Technology, vol. 34, No. 22, Nov. 15, 2016.

Lindner, E. et al. Trends and future of fiber Bragg grating sensing technologies: tailored draw tower gratings (DTGs), vol. 9141, 2014, pp. 91410X-1-91410-8.

Mizuno, Y. et al. "Proposal of Brillouin optical correlation-domain reflectometry (BOCDR)" Opt. Express, vol. 16, No. 16, pp. 12148-12153, Aug. 2008.

Prefer, E. et al. "High-resolution Brillouin optical correlation domain analysis with no spectral scanning" Opt. Express, vol. 24, No. 24, pp. 27253-27267, Nov. 2016.

Shiomi, O. et al. "Double-pulse pair Brillouin optical correlation-domain analysis" Opt. Express, vol. 24, No. 23, pp. 26867-26876, Nov. 2016.

Soto, M. A. et al. "Optimization of a DPP-BOTDA sensor with 25 cm spatial resolution over 60 km standard single-mode fiber using Simplex codes and optical pre-amplification" Opt. Express, vol. 20, No. 7, pp. 6860-6869, Mar. 2012.

Luo, Z. et al. "A time- and wavelength-division multiplexing sensor network with ultra-weak fiber Bragg gratings," Opt. Express, vol. 21, No. 19, pp. 22799-22807, Sep. 2013.

\* cited by examiner

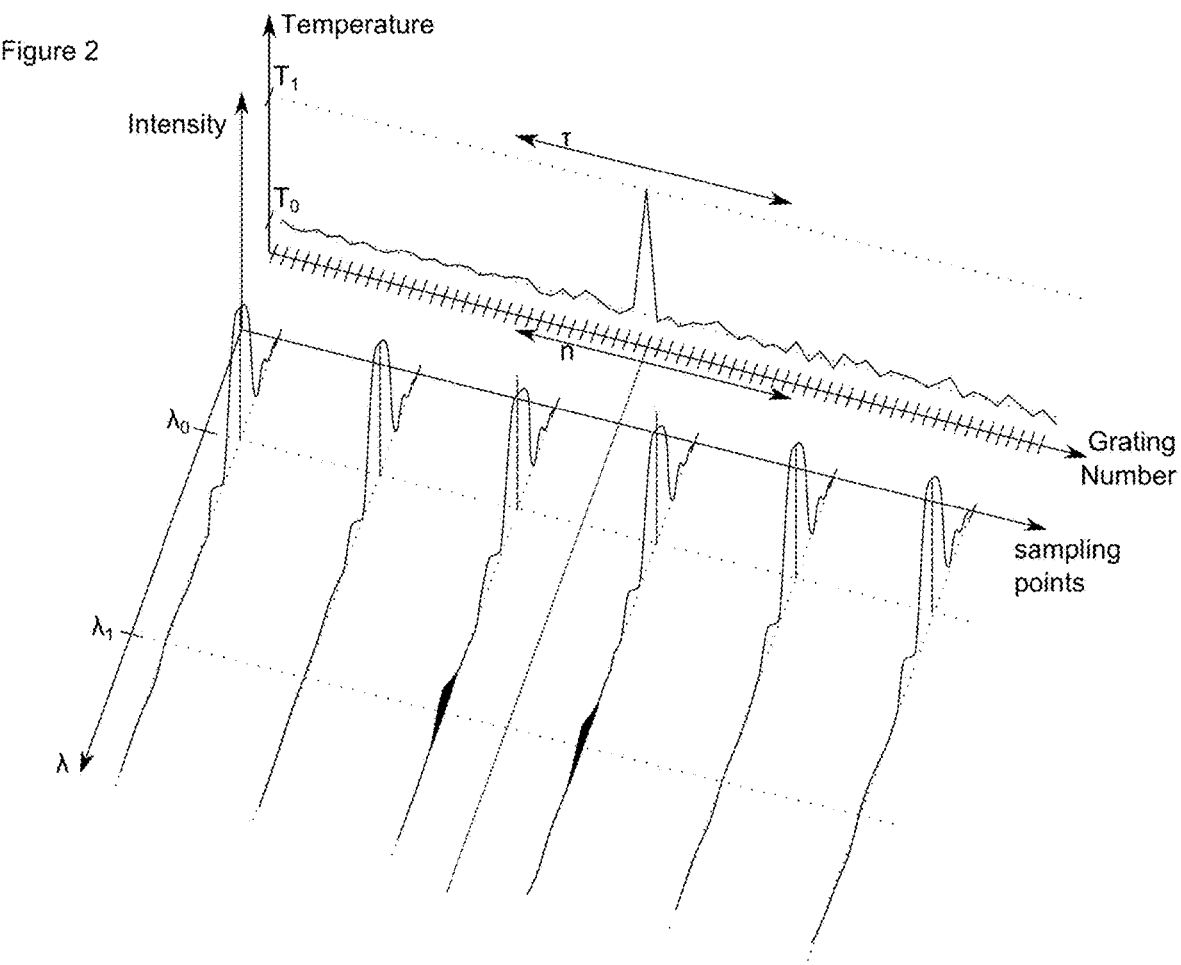

Pulse train

Receiver 1

Receiver 2

SENSOR SYSTEM

This specification relates to a sensor system for detection and localisation of changes in, or values for, an environmental condition, for example temperature, strain or pressure.

Small events like leaks, overstretching or cracks may be detected by using temperature or strain effects on an optical fibre attached or installed nearby to a surface or region to be monitored. GB 2485808A describes a system which makes use of an optical fibre comprising a long fibre Bragg grating (FBG) to determine a maximum and minimum temperature value in a continuous measurement region. The system of GB 2485808A is however not capable of localising the position of a "hotspot" within the region.

The present specification describes a sensor system for detection and localisation of changes in or values for at least one environmental condition.

The sensor system includes a source of pulses of electromagnetic radiation. The source is configured to emit electromagnetic radiation at a plurality of different wavelengths. For example, different pulses may have different wavelengths.

The system also includes an optical fibre in optical communication with the source of pulses. The optical fibre includes one or more fibre Bragg gratings having a reflectance and/or transmittance which varies in dependence on the at least one environmental condition.

The one or more fibre Bragg gratings may comprise multiple fibre Bragg gratings which each operate at the same or substantially the same reflectance/transmittance wavelength when the environmental condition is the same (e.g. when the temperature or strain is the same).

In some embodiments the system may include at least 100 fibre Bragg gratings, at least 500 fibre Bragg gratings, or at least 1000 fibre Bragg gratings. However, alternatively, the optical fibre may comprise a single long fibre Bragg grating, e.g. a quasi-continuous weak grating).

The system also includes a detection unit for detecting, at a plurality of different times, electromagnetic radiation which has been reflected or transmitted by at least one of the fibre Bragg gratings. The detection unit is configured for detecting electromagnetic radiation at the plurality of different wavelengths. In this way, a spectral response can be determined for different spatial regions along the optical fibre. A change in the environmental condition at a spatial region may be determined based on the respective spectral response.

The duration of a pulse of the electromagnetic radiation may be greater than 1 ns (for example between 5 ns and 10 ns), wherein the duration of the pulse may be determined as the full width at half maximum (FWHM). Consequently each pulse may be long enough so that it can simultaneously interrogate more than one grating. That is, the pulse duration may exceed twice the travel time between two neighbouring gratings. In this way an integrated response is recorded. Nevertheless, the system can detect and localise changes or values (e.g. changes in or values for temperature, strain) on the cm-scale (e.g. with a spatial extent below 5 cm) on a structure of, for example, 10s to 100s of meters, and can do so without use of complex and expensive GHz optoelectronics and GHz-ADCs.

More generally, in various embodiments the pulse duration may be longer than twice the time to traverse a region of interest, where the region of interest may be defined by the distance between two neighbouring gratings. Alternatively, in embodiments in which the optical fibre comprises e.g. a single long fibre Bragg grating, and the environmental condition is to be detected in a particular minimum region of interest (ROI), the pulse duration may be longer than twice the time taken for the pulse to traverse this particular minimum ROI.

This specification also describes a method for detection and localisation of changes in or values for at least one environmental condition. The method comprises emitting pulses of electromagnetic radiation, for example emitting a pulse at a first wavelength and subsequently emitting a pulse at a second wavelength. The method further comprises detecting, at a plurality of different times, electromagnetic radiation which has been reflected or transmitted by one or more fibre Bragg gratings included in an optical fibre.

The method further comprises monitoring the environmental condition at a plurality of spatial regions along the fibre. This may comprise determining a spectral response for the different spatial regions along the optical fibre.

Monitoring the environmental condition may comprise measuring the response of the one or more fibre Bragg gratings to the pulse at the first wavelength, and thus generating a spatially resolved intensity profile corresponding to the first wavelength. Monitoring the environmental condition may further comprise measuring the response of the one or more fibre Bragg gratings to the pulse at the second wavelength, thus generating a spatially resolved intensity profile corresponding to the second wavelength. Determining a spectral response for a spatial region may comprise selecting values corresponding to the spatial region from the spatially resolved intensity profiles for the first and second wavelengths.

So that the invention may be more easily understood, embodiments thereof will now be described, with reference to the accompanying drawings, in which:

FIG. 2 illustrates the spectral response at different spatial locations in accordance with an example embodiment.

FIG. 1 shows an example embodiment of a fibre optic sensor system comprising an interrogator unit 1 and a sensor unit 2.

Figure 1:
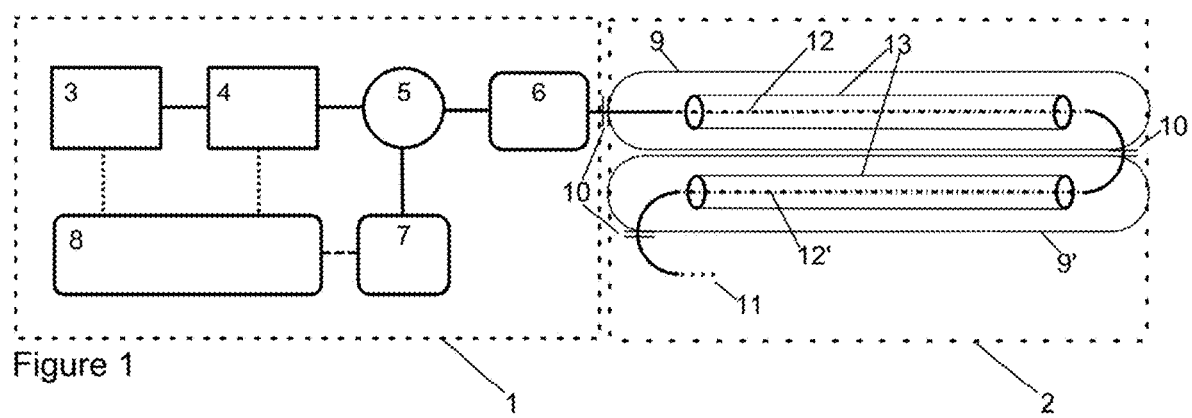
FIG. 1 shows an example embodiment of a fibre optical sensor system.

The interrogator unit 1 comprises a light source 3, a pulse modulator 4, a circulator or coupler 5, a reference cell 6, a photo receiver 7, a digital control unit 8 comprising an Analog-Digital-Converter (ADC), a digital signal processing (DSP) unit, and control for the light source and the pulse generation. The DSP unit may include aa field programmable gate array (FPGA) connected to the ADC and configured to handle instrumental control such a triggering, and at least the first steps of the signal processing.

The light source may comprise a swept laser, i.e. a laser which is configured to "sweep" the emission wavelength of the laser through a particular wavelength range.

The pulse modulator may for example comprise an acousto-optic modulator (AOM), a semiconductor optical amplifier (SOA), an electro-optic modulator, or any other suitable fast optical switch The sensor unit 2 comprises at least one sensing segment 9, which is connected by a fibre optical connector 10 and terminated with a termination section 11. The sensing unit can contain several sensing segments (e.g. 9, 9') connected with fibre optical connectors. The sensing segment comprises a sensing fibre 12, which includes an array of fibre Bragg gratings (FBG), where all gratings preferably have a predetermined peak reflectance wavelength $\lambda_1$. A temperature or strain change shifts the central wavelength of the reflectivity of one or more FBG near the event. The temperature response of the wavelength of a FBG may be about 10 pm/° C. at an operating wavelength of 1550 nm. The strain response at the wavelength may be about 1.2 pm/µε.

The sensing segment may further comprise a protecting tube (13), preferably a metal tube to protect the sensing fibre. A further segment (9') may contain a fibre Bragg grating (12') array with a wavelength $\lambda_2$, which lies outside the spectral measurement range of the FBG arrays in the other sensor segments.

A sensor segment may be designed in such way that the smallest structure to be observed is larger than the period of the FBG array, so that no positioning of the sensor fibre itself is required. The FBGs could also be at randomized positions with a maximum distance as large as the smallest structure to be observed and with a minimum distance as small as the length of the FBGs itself.

The reflectivity of each FBG in the array is designed to be very, low preferably <0.1%. Advantageously, this allows for the monitoring of more than thousand identical gratings at the same temperature. The bandwidth of each grating may be as narrow as possible to improve wavelength accuracy. The bandwidth decreases yet with longer grating length, but the grating length may be limited by the minimum distance between two gratings.

The Fibre Bragg Gratings are preferably apodized to avoid crosstalk of summed up side lobes with the main lobe of a single shifted grating at the start of the sensor.

The termination section 1 should prevent a direct reflection of the input signal light. The back reflection could be minimized if the fibre end is cleaved at an angle or tightly spooled around a small diameter cylinder or if the fibre end is embedded in a material with matching refractive index.

In use, the interrogator 1 generates a pulse train with a repetition rate that considers the travel time of light within the sensor unit. The pulse duration T may correspond to the required spatial resolution and exceed two times the sampling interval of the ADC according to Nyquist-Shannon theorem. The wavelength of the pulses changes with the sweep of the wavelength of the light source.

For every pulse the response of the FBG arrays in the sensor segments is measured by the photo receiver. The spatially resolved intensity is digitized using the ADC. By synchronizing the wavelength sweep of the light source with the repetition rate of the pulse modulator several traces could be averaged in the DSP unit. A full wavelength sweep thus generates a spectral response for every sampling point.

There are at least two possibilities to synchronize wavelength sweep and pulse modulation. For example, the pulse repetition rate may be an integer multiple m of the sweep repetition rate. Thus, the spectrum of every spatial sampling point contains m intensity values. Alternatively, the ratio of the sweep repetition rate and the pulse repetition rate may be a fraction of integer values k/l with k>l, preferably with k=l+1. In the latter case a spectrum contains l intensity values.

The linearity of the wavelength sweep can be tested with the reference cell 6. This cell comprises at least two FBGs spectrally equally distributed in the wavelength range of the sweep. The gratings have to be separated spectrally by their own bandwidth to clearly separate them in the recorded data. The reference cell comprises also several meters of feed fibre to also spatially separate the reference cell from the sensor unit 2. The reference cell contains also at least one temperature sensor which can be used to correct the peak position of the grating.

The spectrum of one location may contain information from more than one Bragg grating reflection. This is because the pulse duration (typically 5 ns-10 ns) may exceed twice the travel time between two gratings. For example if the distance between two gratings is 20 mm, then the pulse duration may greater (e.g. substantially greater) than about 200 ps.

The travel time between two gratings may be determined as the time taken for the peak of the pulse to travel from the middle point of one grating to the middle point of the next grating. The factor of two mentioned above arises due to consideration of both the incoming and outgoing (i.e. reflected) light [i.e. "back and forth" time].

In this way, each pulse may simultaneously interrogate multiple gratings, so that an integrated response is recorded. A measurement of a temperature event with only minimal spatial extent could result in only a single grating with a shifted wavelength response.

This situation is depicted in FIG. 2. The temperature $T_0$ corresponds to the wavelength $\lambda_0$, the temperature $T_1$ to the wavelength $\lambda_1$. In this case n gratings are interrogated at the same time. The response of the single grating at temperature $T_1$ can be isolated in the optical wavelength domain from response of the gratings at temperature $T_0$. For a sampling point, which is within a distance of one pulse length to the grating at temperature $T_1$, the intensity at the wavelength $\lambda_1$ is raised, at the expense of signal at the wavelength $\lambda_0$.

Thus, the spectrum at every point can be analyzed to give a minimum temperature and a maximum temperature in its proximity. A temperature event can thus be localised up to the precision of the pulse duration.

Hence, by monitoring the spectrum at each point, changes in temperature (or other environmental condition) may be detected and localised. Alternatively, or in addition, values (e.g. absolute value) for the environmental condition (e.g. temperature) may be determined. In some embodiments absolute values for the environmental condition may be determined by calibration of the measured spectrum. However, alternatively, absolute values may be calculated based on the measured intensity values and known parameters of the system (e.g. known parameters of the FBGs), thereby avoiding the need for calibration.

In some examples, minimum and maximum temperatures may be determined from a spectrum by correlation with a peak function, or using a linear combination of peak functions, or a multi-peak fit with weighted peak functions. Reference is directed to "N. S. Schreiner et al.," High Resolution FMCW Millimeter-Wave and Terahertz Thickness Measurements" Proc. of 47th European Microwave Conference p. 1187-1190.

In some examples a learning algorithm may be used to determine the minimum and maximum temperatures based on a spectrum. Reference is directed to Huan Wu et al., "Support vector machine assisted BOTDA utilizing combined Brillouin gain and phase information for enhanced sensing accuracy", Optics Express, Vol. 25, No. 25 p. 31210-31220

In some embodiments, a peak tracking algorithm could be applied for every single spectrum or also in spatial direction. Suitable peak tracking algorithms are described in D. Tosi, "Review and Analysis of Peak Tracking Techniques for Fiber Bragg Grating Sensors," Sensors, vol. 17, no. 10, p. 2368, 2017.

For a predominantly isothermal fibre with at least one event, the ratio of the event peak to the isothermal peak at the wavelength $\lambda_o$ is near to one for a distant point due to the loss at the isothermal temperature. Close to this main peak absolute evaluation of the event peak wavelength $\lambda_1$ is hindered by the side lobes of the main peak and distortion of the exciting spectrum due to loss during propagation, but a maximum temperature may be given.

The coherence length of the swept laser may be larger than the length of one individual grating and shorter than the distance between two adjacent gratings. Otherwise, the spectral interference of the response of two adjacent gratings may obstruct direct evaluation of the peak wavelength positions of the FBGs.

The sweep bandwidth of the light source covers the range of wavelength which could be pertinent for the designed temperature or strain range, e.g. 3.5 nm for a temperature range of 350° C. The intensity is ideally equal over the full sweep spectrum.

As will be understood from the foregoing, various embodiments provide a low-cost interrogator-sensor combination, which can detect and localize events (e.g. temperature, strain) at the cm-scale on a structure of 10s to 100s of meters. Various embodiments thus provide an efficient solution for applications where events with small spatial dimensions have to be detected on the surface of larger objects. Examples are:
  Small leaks at air, other gas or liquid pipes
  Cracks in structures like tunnels, bridges, reactors, . . .
  (Over)stretching of structures under mechanical or pressure load (airplane structures, wind turbine wings)

Figure 3A:
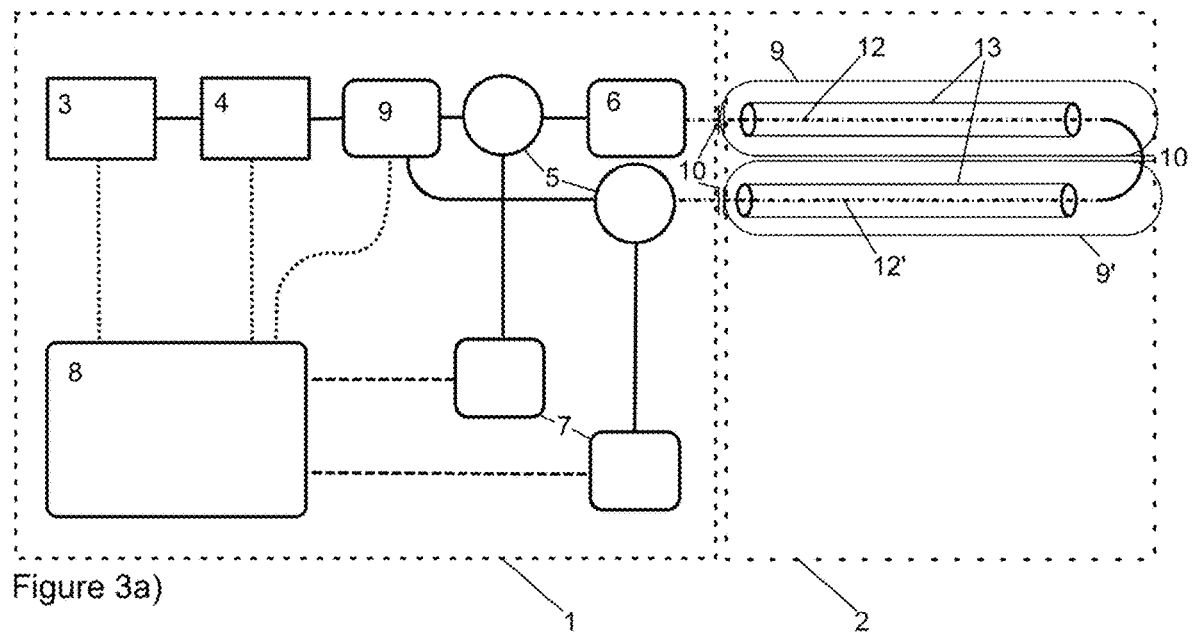
FIG. 3a shows an example of a fibre optical sensor system in which the sensor unit is formed as a loop.
Figure 3B:
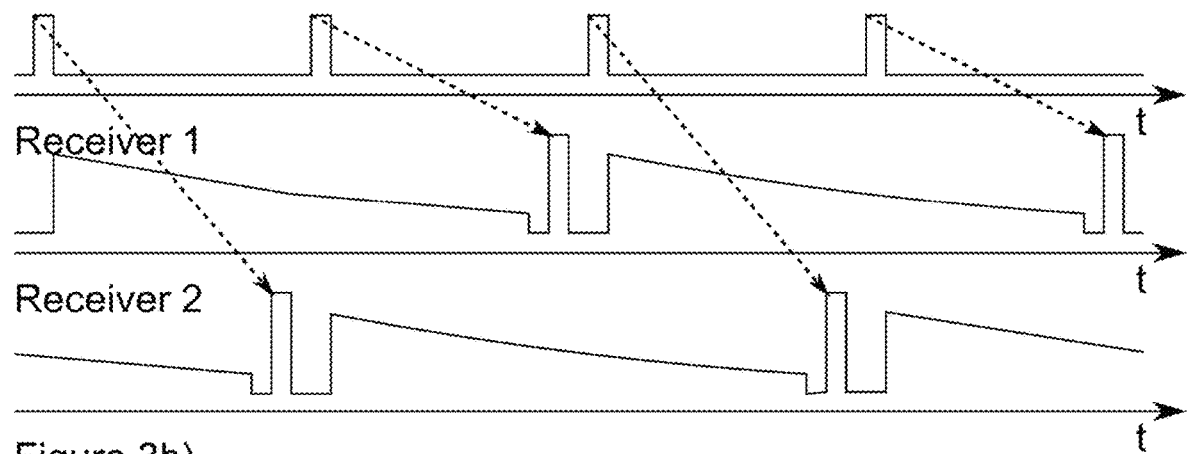
FIG. 3b shows the measured trace for the two receivers.

Another embodiment of the invention is shown in FIG. 3a. In this case the sensor unit 2 is formed as a loop. The interrogator unit 1 comprises a fast fibre switch 9 and a doubled receiver path (circulators 5, receivers 7). The temporal pulse spacing generated by the optical modulator is as large as the single path traveling time plus the dead time after the direct impact of the pulse on the photo receivers 7. The fibre switch redirects every second pulse into the loop in a counter-propagating direction. Consequently, measurement of the full sensor element is possible even after a fibre break. The measured trace for the two receivers and the pulse train after the modulator 4 is depicted in FIG. 3b. The interleaved pulse train structure enables measurement in both directions without dead time due to saturation by the direct path from light source to receiver.

Many further modifications and variations will be evident to those skilled in the art, that fall within the scope of the following claims:

The invention claimed is:

1. Sensor system for detection and localisation of changes in or values for at least one environmental condition, comprising:
  a source of pulses of electromagnetic radiation, wherein the source is configured to emit electromagnetic radiation at a plurality of different wavelengths;
  an optical fibre in optical communication with the source of pulses, wherein said optical fibre includes one or more fibre Bragg gratings having a reflectance and/or transmittance which varies in dependence on the at least one environmental condition; and
  a detection unit for detecting, at a plurality of different times, electromagnetic radiation which has been reflected or transmitted by at least one of the fibre Bragg gratings,
  wherein the detection unit is configured for detecting electromagnetic radiation at the plurality of different wavelengths, such that a spectral response can be determined for different spatial regions along the optical fibre, wherein a change in or value for the environmental condition at a spatial region may be determined based on the respective spectral response, and
  wherein the one or more fibre Bragg gratings includes first and second neighbouring fibre Bragg gratings, and wherein the duration of a pulse of the electromagnetic radiation exceeds twice the time taken by the pulse to travel from the first fibre Bragg grating to the second fibre Bragg grating.

2. The sensor system as claimed in claim 1, wherein the one or more fibre Bragg gratings comprise multiple fibre Bragg gratings which each have the same or substantially the same peak reflectance wavelength when at the same temperature.

3. The sensor system as claimed in claim 2, wherein the multiple fibre Bragg gratings comprise 16 or more fibre Bragg gratings.

4. The sensor system as claimed in claim 1, wherein the duration of a pulse of the electromagnetic radiation is between 5 ns and 10 ns.

5. The sensor system as claimed in claim 1, wherein the source is configured to vary the wavelength of electromagnetic radiation emitted by the source, and further comprising control electronics configured to control the source to synchronise the variation of the wavelength and the repetition rate of the pulses.

6. The sensor system as claimed in claim 1, further comprising a data processing apparatus configured to receive data derived from the detection unit and to determine the spectral response for different spatial locations based on the received data.

7. The sensor system as claimed in claim 6,
  wherein the detection unit is configured to obtain a plurality of spatially resolved intensity profiles using pulses of different peak wavelengths, wherein obtaining a spatially resolved intensity profile comprises detecting electromagnetic radiation received at a plurality of times after a pulse has been emitted by the source, and
  wherein determining the spectral response comprises processing the plurality of spatially resolved intensity profiles to determine, for each spatial location, a response corresponding to each peak wavelength.

8. The sensor system as claimed in claim 1, comprising one or more optical fibres, said one or more optical fibre including said optical fibre, wherein the one or more optical fibres include a first fibre Bragg grating having a peak reflectance at a first wavelength and a second fibre Bragg grating having a peak reflectance at a second wavelength which is different to the first wavelength.

9. The sensor system as claimed in claim 1, wherein the reflectance of one or more of the fibre Bragg gratings is less than 0.1%.

10. The sensor system as claimed in claim 1, wherein the source of pulses of electromagnetic radiation comprises a seed source of electromagnetic radiation and a modulator in optical communication with the seed source, wherein the modulator is configured to modulate the electromagnetic radiation derived from the seed source to provide pulses of electromagnetic radiation.

11. The sensor system as claimed in claim 1, comprising one or more optical fibres, wherein the one or more optical fibres include at least 100 fibre Bragg gratings.

12. The sensor system as claimed in claim 1, wherein said optical fibre is formed in a loop.

13. The sensor system as claimed in claim 12, further comprising a fibre switch configured to alternatively direct pulses into the loop in counter-propagating directions.

14. The sensor system as claimed in claim 1, wherein at least one environmental condition comprises temperature.

15. A method for detection and localisation of changes in or values for at least one environmental condition, comprising:
- emitting pulses of electromagnetic radiation;
- detecting, at a plurality of different times, electromagnetic radiation which has been reflected or transmitted by one or more fibre Bragg gratings included in an optical fibre,
- monitoring the environmental condition at a plurality of spatial regions along the fibre, comprising determining a spectral response for said different spatial regions along the optical fibre,
- wherein the duration of a pulse of the electromagnetic radiation exceeds twice the time taken for the pulse to travel from a first fibre Bragg grating to a second fibre Bragg grating.

16. The method of claim 15,
- wherein emitting electromagnetic radiation at a plurality of different wavelengths comprises emitting a pulse at a first wavelength and subsequently emitting a pulse at a second wavelength, and
- wherein monitoring the environmental condition comprises:
  - measuring the response of the one or more fibre Bragg gratings to the pulse at the first wavelength, thereby to generate a spatially resolved intensity profile corresponding to the first wavelength,
  - measuring the response of the one or more fibre Bragg gratings to the pulse at the second wavelength, thereby to generated a spatially resolved intensity profile corresponding to the second wavelength; and
  - wherein determining a spectral response for a spatial region comprises selecting values corresponding to the spatial region from the spatially resolved intensity profiles for the first and second wavelengths.

17. The method of claim 15, wherein the duration of a pulse of the electromagnetic radiation is between 5 ns and 10 ns.

18. The method of claim 15, wherein the one or more fibre Bragg gratings comprise multiple fibre Bragg gratings which each have the same or substantially the same peak reflectance wavelength when at the same temperature.

* * * * *